(12) United States Patent
Petty et al.

(10) Patent No.: US 10,948,341 B2
(45) Date of Patent: Mar. 16, 2021

(54) OPTICAL INFORMATION COLLECTION SYSTEM

(71) Applicants: Thomas Edmund Petty, Arlington, VA (US); Peter H. Mui, Fairfax, VA (US)

(72) Inventors: Thomas Edmund Petty, Arlington, VA (US); Peter H. Mui, Fairfax, VA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 146 days.

(21) Appl. No.: 16/264,221

(22) Filed: Jan. 31, 2019

(65) Prior Publication Data
US 2020/0249080 A1 Aug. 6, 2020

(51) Int. Cl.
*G01J 1/44* (2006.01)
*G01J 1/04* (2006.01)
*H04N 5/225* (2006.01)

(52) U.S. Cl.
CPC .............. *G01J 1/0403* (2013.01); *G01J 1/44* (2013.01); *H04N 5/2259* (2013.01)

(58) Field of Classification Search
CPC .............................. G06K 9/605; G06N 3/0675
See application file for complete search history.

(56) References Cited

U.S. PATENT DOCUMENTS

2015/0269439 A1* 9/2015 Versace .................. G06T 7/194
382/103

OTHER PUBLICATIONS

Yousefzadeh, A. et al.: "Active Perception With Dynamic Vision Sensors. Minimum Saccades With Optimum Recognition," IEEE Transactions on Biomedical Circuits and Systems, vol. 12, No. 4, Aug. 2018, pp. 927-939.
Wilson: "Researchers use neuromorphic imaging to build smart sensors"; Found on the internet Jan. 28, 2019 at: https://www.vision-systems.com/articles/print/volume-4/issue-10/features/feature-article/researchers-use-neuromorphic-imaging-to-build-smart-sensors.html.
Posch, et al.: "How Neuromorphic Image Sensors Steal Tricks From the Human Eye"; found on the internet Jan. 28, 2019 at: https://spectrum.ieee.org/biomedical/devices/how-neuromorphic-image-sensors-steal-tricks-from-the-human-eye; pp. 105.

* cited by examiner

*Primary Examiner* — Thanh Luu
(74) *Attorney, Agent, or Firm* — Tarolli, Sundheim, Covell & Tummino LLP

(57) ABSTRACT

An optical information collection system includes a neuromorphic sensor to collect optical information from a scene in response to change in photon flux detected at a plurality of photoreceptors of the neuromorphic sensor. A sensor stimulator stimulates a subset of the plurality of photoreceptors according to an eye movement pattern in response to a control command. A controller generates the control command that includes instructions to execute the eye movement pattern.

20 Claims, 11 Drawing Sheets

_(12)_ United States Patent US 10,948,341 B2

OPTICAL INFORMATION COLLECTION SYSTEM

TECHNICAL FIELD

This disclosure relates to an optical information collection system for neuromorphic sensor stimulation that model eye movement patterns to facilitate optical information collection.

BACKGROUND

Neuromorphic sensors are man-made sensors that attempt to imitate some of the working principles or structures of their biological counterparts. A neuromorphic vision sensor is thus, an artificial man-made vision sensor that emulates some of the working principles or structures found in living organisms' visual systems. Conventional video cameras are based capturing a sequence of still frames. Improving a camera means normally to increase the total number of pixels (resolution) and/or to increase the number of frames per second that can be captured, while reducing sensor area, power consumption, and possibly fabrication cost. These cameras just capture the light intensities of visual reality. If they are to be used in an artificial vision system (e.g., for robotics), then subsequent computing resources need to be allocated to analyze the sequence of captured frames and extract relevant information for decision making.

A neuromorphic sensor on the other hand only produces output optical data if a change at a given pixel location is detected. Thus, if the sensor is moved passed a given scene, image data can be collected based on the respective movement of the sensor. Alternatively, if the sensor is fixed in a given location, and a given scene changes (e.g., through motion or light fluctuation), image data can be similarly collected by the sensor. Current neuromorphic systems rely on scene motion or are based on macro-scale movements of the sensor to collect data. This may not be the most efficient manner in which to collect and interpret sensor data with respect to a given scene.

SUMMARY

This disclosure relates to an optical information collection system. In one example, an optical information collection system includes a neuromorphic sensor to collect optical information from a scene in response to change in photon flux detected at a plurality of photoreceptors of the neuromorphic sensor. A sensor stimulator stimulates a subset of the plurality of photoreceptors according to an eye movement pattern in response to a control command. A controller generates the control command that includes instructions to execute the eye movement pattern.

In another example, a device includes a housing that includes an optical lens to receive optical information from a scene. A neuromorphic sensor within the housing collects optical information from the scene via the optical lens. A sensor stimulator stimulates the neuromorphic sensor according to an eye-movement pattern in response to a control command. A controller in the housing generates the control command to the sensor stimulator to cause movement of the sensor stimulator according to the eye-movement pattern to approximate movements of a human eye and enable collection of the optical information from the scene. The eye-movement pattern includes a first parameter that describes a first position for the sensor stimulator and includes a second parameter that describes movement of the sensor stimulator along a specified distance and direction away from the first position.

In yet another example, a method includes collecting optical information from a scene in response to change in photon flux detected at a photoreceptor of a neuromorphic sensor. The method includes generating a control command to cause stimulation of the neuromorphic sensor according to a fixational eye-movement pattern that approximates movement of a human eye. The fixational eye-movement pattern includes a first parameter that describes a first position to collect the optical information and includes a second parameter that describes movement along a specified distance and direction away from the first position. The method includes stimulating the neuromorphic sensor with the control command to collect the optical information from the scene.

DETAILED DESCRIPTION

Figure 1:
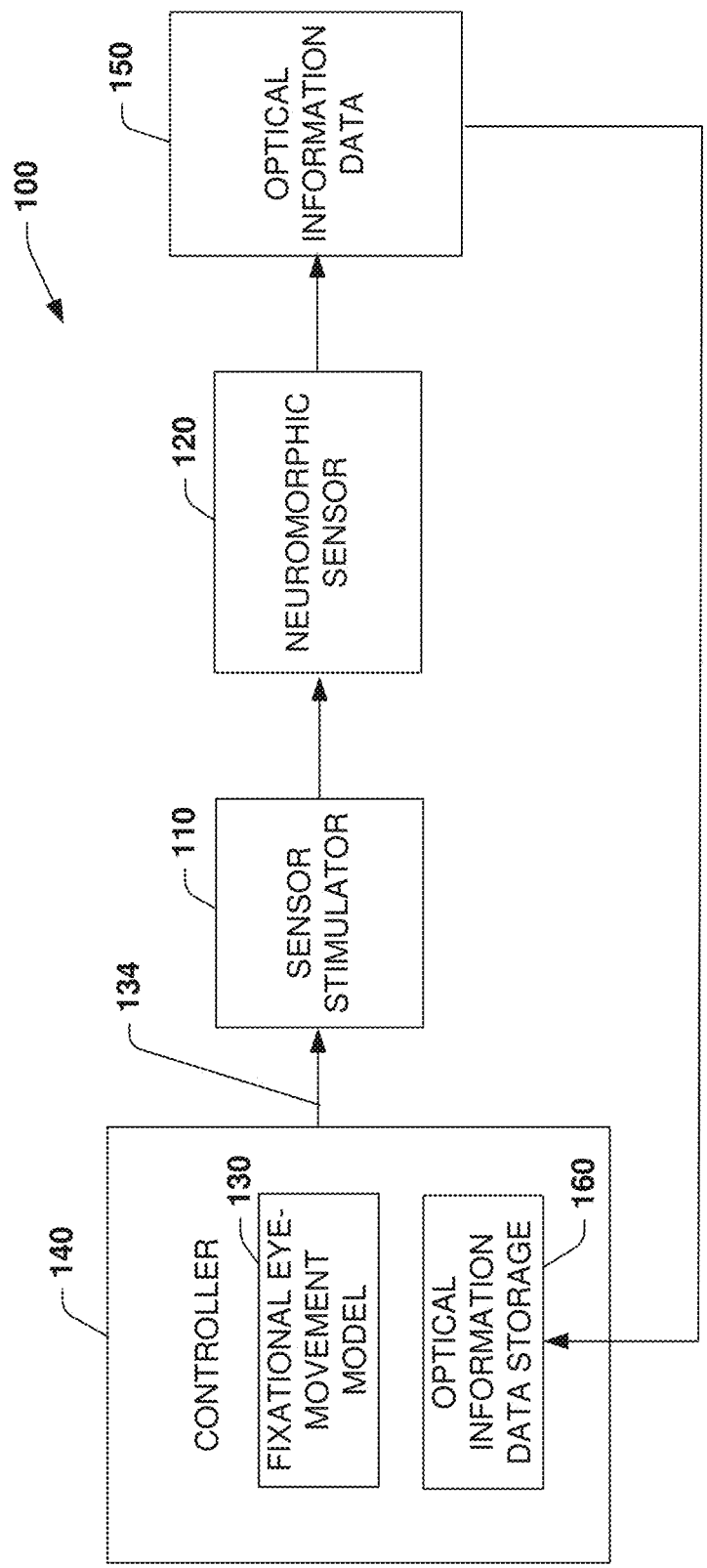
FIG. 1 illustrates an example system that employs a sensor stimulator to stimulate a neuromorphic sensor in accordance with a fixational eye-movement pattern to collect optical information from the sensor.

This disclosure relates to an optical information collection system for neuromorphic sensor stimulation that model eye movement patterns to facilitate optical information collection. A neuromorphic sensor system can be provided that employs precise and controlled sensor movements to emulate human eye characteristics and to improve sensor performance. In other examples, a sensor stimulator such as a controllable mirror can be employed to move optical information from a scene across the sensor in order to collect optical information from the sensor. Most biological vision systems use a "sensory-motor" model of vision in that the neural system generates eye and head movements to steer the field of view and a copy of those commands project to the areas of the brain that also receive the neural spikes from the retina and perform the interpretation of the data. The systems and methods disclosed herein model the biological system to create automated eye-movement patterns to stimulate the neuromorphic sensor in such a manner as to increase the efficiency of data collection in accordance with the patterns.

An example system includes a neuromorphic focal plane array (FPA) that is mounted on positioning device such as a linear motion stage that is controlled via a controller to cause movement of the sensor (e.g., within a camera) and according to an fixational eye-movement pattern to enable efficient data collection from the sensor. Fixational eye-movement patterns can be stored as controller models that allow for precise sensor movements such as tremor, drift, and micro saccades which emulate that movements of the eye and allow sensor data to be collected and processed in a rapid and efficient manner. Multi-axis micro-positioners can be employed to stimulate a response from the neuromorphic FPA. This can be implemented as an opto-mechanical structure coupled with associated eye-movement and control models.

A focal plane that responds to changes independently at each pixel of the sensor (similar to the retina of the eye) can be mounted on an x-y piezo controlled stage with a fixed lens assembly. The positioner can be used to generate desired motion and therefore desired output on demand from the FPA. Since the motion is rapid and over small distances defined by fixational eye movement patterns, downstream processing can be applied to perform super-resolution efficiently and to emulate fixational eye movements of the retina when used with neuromorphic FPA's. Fixational eye movements are what allow humans to see due to the response characteristics of retinal photoreceptors which can be emulated via movement of the FPA (or movement of a controllable mirror projecting onto the FPA). This is an efficient process to capture visual information which can lead to lower power vision systems.

A fixed lens assembly can be employed to focus light on the FPA. The motion of the FPA behind the fixed lens translates into an angular scene motion much like the human eye. Using piezoelectric stages, for example, motion of the FPA can be controlled precisely to generate desired data collection profiles. This allows the sensor system to "request" the type of visual information to be collected from the scene (e.g., Vertical Edge, Horizontal Edge, High Spatial Frequency, Low Spatial Frequency, and so forth).

A characteristic that neuromorphic sensors have is that like the human eye, either the scene or the camera has to move to generate optical output. The human eye solves this when fixated (such as reading) by making rapid involuntary movements called micro-saccades, drift, and ocular micro tremor (OMT). A fixational eye-movement pattern can be modeled (e.g., by stored controller parameters) that emulates the micro-saccades, drift, and OMT of the eye by controlling movement of the sensor within constraints associated with human eye movements. Other examples could use a sensor stimulator such as a pointing mirror, gimble assembly, or moving a lens to project optical information on to the sensor. This optical information collection system can also be used as a test fixture when calibrating or characterizing the neuromorphic FPA since it can be precisely controlled according to desired eye-movement patterns.

FIG. 1 illustrates an example system 100 that employs a sensor stimulator 110 to stimulate a neuromorphic sensor 120 in accordance with a fixational eye-movement model 130 that stores an eye-movement pattern to collect optical information from the sensor. As used herein, the term fixational eye-movement model refers to parameters that define eye-movement patterns within the model that cause the sensor stimulator 110 to stimulate the neuromorphic sensor 120 in such a manner as to emulate the human eye in order to collect optical information from the neuromorphic sensor. Example eye-movement patterns stored in the eye-movement model 130 include tremor movements, drift movements, and micro saccades movements which are described below.

The system 100 can be implemented as an optical information collection system that includes the neuromorphic sensor 120 to collect optical information from a scene in response to change in photon flux detected at a photoreceptor of the neuromorphic sensor. The sensor stimulator 110 stimulates the neuromorphic sensor 120 to collect the optical information from the scene in response to a control command 134. As used herein, the term stimulates refers to moving the neuromorphic sensor 120 in one example to collect optical information (see e.g., FIGS. 2, 4, and 5). Stimulate can also refer to moving scene data across the neuromorphic sensor such as via a controllable mirror (see e.g., FIG. 3).

A controller 140 generates the control command 134 to the sensor stimulator 110 to cause stimulation of the neuromorphic sensor 120 according to the fixational eye-movement model 130 and eye-movement patterns stored therein that describes movement of an eye and enables collection of the optical information data 150 from the scene. As the optical information data 150 is generated in response to neuromorphic sensor stimulation, it can be stored in an optical information data storage 160 at the controller 140. In another example, the optical information data storage 160 can be implemented externally to the controller 150. The fixational eye-movement model 130 includes eye-movement patterns that include a first parameter that describes a first position for the sensor stimulator 110 and includes at least a second parameter that describes movement of the sensor stimulator 110 along a specified distance away from the first position. The second parameter is constrained to a predetermined distance away from the first position based on similar constraints of movement associated with a human eye.

The first position for the sensor stimulator 110 can be moved to a subsequent location to collect optical information from other portions of the scene and or from differing portions of the neuromorphic sensor 120. A third parameter can be defined in the fixational eye-movement model 130 that defines an eye-movement pattern for speed of movement for the sensor stimulator 110 from the first position and along the specified distance described by the second parameter. In one example, the second parameter defines an ocular micro tremor (OMT) movement with respect to the first position for the sensor stimulator 110. The OMT movement is a periodic motion superimposed upon the drift movement described herein from the starting position up to the specified distance defined by the second parameter. The OMT movement can have an amplitude of about 1 to 3 photoreceptors and a frequency range of about 2 Hertz (Hz) to about 150 Hz as specified by the third parameter.

In another example, the second parameter defines a drift movement with respect to the first position for the sensor stimulator 110. Drift movements occur concurrently with tremor movements and are slow motions of the eye that occur during the epochs between micro saccades movements. The drift movement occurs over a distance of about 3 to 12 photoreceptors at a mean speed of about 3 to 30 photoreceptors per second as specified by the third parameter. The drift movement can occur over linear paths or non-linear paths and can be described by linear and/or angular distances.

In yet another example, the second parameter defines a micro saccades movement with respect to the first position for the sensor stimulator 110. Micro saccades are small, fast, jerk-like eye movements that occur during voluntary fixation of the eye. They carry the retinal image across a range of several dozen to several hundred photoreceptor widths, and are about 25 milliseconds in duration. For example, the micro saccades movement occurs over a distance of about 3 to 15 photoreceptors, at a speed of about 100 to 10000 photoreceptors per second.

In an example, the sensor stimulator 110 can be a linear motion stage (see e.g., FIGS. 2, 4, and 12) that moves the neuromorphic sensor 120 across an initial X and Y plane to collect optical information from the scene in response to the control command 134. Movement of the linear motion stage in the X direction collects vertical edges from the scene from pixels of the neuromorphic sensor 120, movement in the Y direction collects horizontal edges from the scene from pixels of the neuromorphic sensor, and concurrent movement in the X and Y direction collects information oriented diagonally across the neuromorphic sensor. The linear motion stage can also include a third axis to vertically move the neuromorphic sensor to a different plane from the initial X and Y plane.

In other examples, the linear motion stage includes a rotational axis to rotate the initial X and Y plane. Also, the sensor stimulator 110 can include include a controllable mirror or lens that moves optical information collected from a scene through a lens assembly across the neuromorphic sensor 120, in response to the control command 134. The sensor stimulator 110 can also include a gimble (see e.g., FIG. 12) that is coupled to the neuromorphic sensor 120 and a lens assembly. The gimble can be moved in one or more directions across the scene to collect optical information from the scene on to the neuromorphic sensor 120 in response to the control command 134. The sensor stimulator 110 can also include a lens assembly having at least one actuated refractive element (see e.g., FIG. 12) responsive to the control command 134. The actuated refractive element causes light received from the scene to stimulate the neuromorphic sensor 120.

In some examples, only one fixational eye movement simulation is generated via the control command 134 from the controller 140. In other examples, two fixational eye-movement simulations are generated concurrently by the control command 134 and in other examples, more than two fixational eye movement simulations are generated concurrently via the control command 134.

Figure 2:
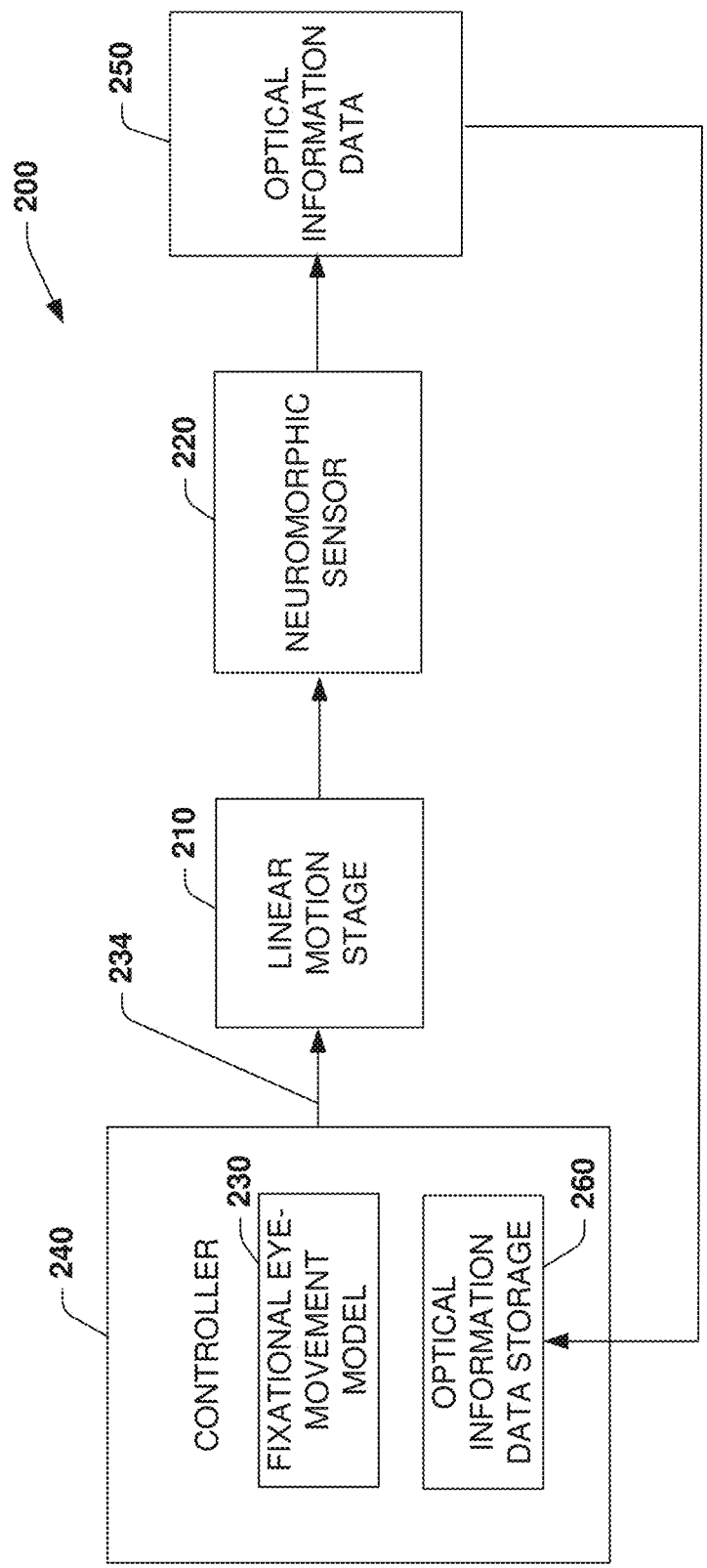
FIG. 2 illustrates an example system that employs a linear motion stage to move a neuromorphic sensor in accordance with a fixational eye-movement pattern to collect optical information from the sensor.

FIG. 2 illustrates an example system 200 that employs a linear motion stage 210 to move a neuromorphic sensor 220 in accordance with a fixational eye-movement model 230 to collect optical information from the sensor. Similar to the system 100 described above with respect to FIG. 1, the system 200 can be implemented as an optical information collection system that includes the neuromorphic sensor 220 to collect optical information from a scene in response to change in photon flux detected at a photoreceptor of the neuromorphic sensor.

The linear motion stage 210, acting as a sensor stimulator, moves the neuromorphic sensor 220 to collect the optical information from the scene in response to a control command 234. The linear motion stage can be activated via piezo-electric forces and can include one, two, or three axes of control for example (see e.g., FIG. 5). A controller 240 generates the control command 234 to the linear motion stage 210 to cause stimulation of the neuromorphic sensor 220 according to the fixational eye-movement model 230 having eye-movement patterns that describes movement of a human eye and facilitates collection of the optical information data 250 from the scene. As the optical information data 250 is generated in response to movement of the neuromorphic sensor 220 via the linear motion stage 210, it can be stored in an optical information data storage 260 at the controller 240.

The linear motion stage 210 moves the neuromorphic sensor 220 across an initial X and Y plane to collect optical information from the scene in response to the control command. The linear motion stage 210 in the X direction collects vertical edges from the scene from pixels of the neuromorphic sensor 220. In the Y direction, it collects horizontal edges from the scene from pixels of the neuromorphic sensor 220, where concurrent movement in the X and Y direction collects information diagonally across the neuromorphic sensor. The linear motion stage 210 can also include a third axis to vertically move the neuromorphic sensor 220 to a different plane from the initial X and Y plane. Also, the linear motion stage 210 can also include a rotational axis to rotate the initial X and Y plane.

Figure 3:
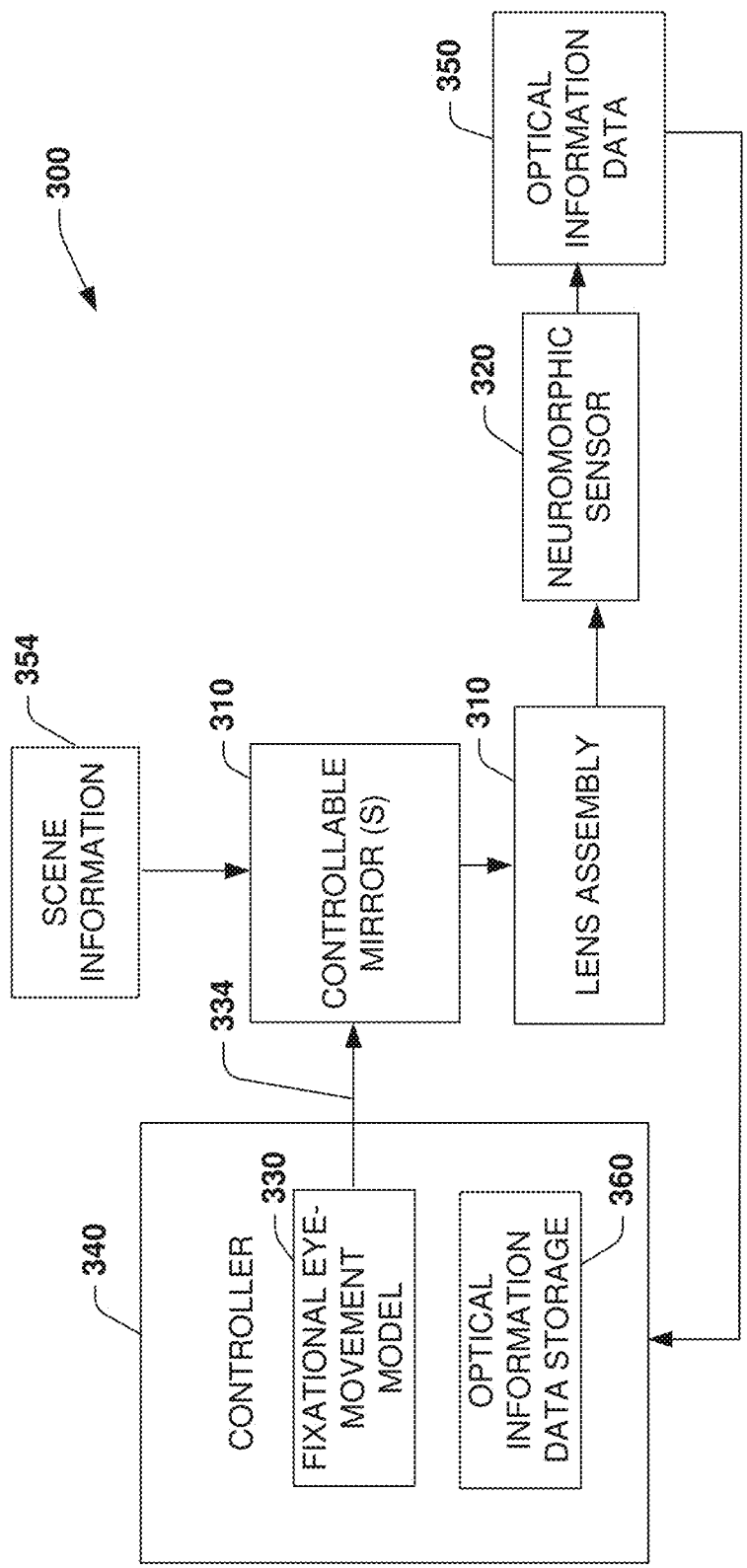
FIG. 3 illustrates an example system that employs a controllable mirror to stimulate a neuromorphic sensor in accordance with a fixational eye-movement pattern to collect optical information from the sensor.

FIG. 3 illustrates an example system 300 that employs a controllable mirror 310 (or mirrors) to stimulate a neuromorphic sensor 320 in accordance with a fixational eye-movement model 330 that includes eye-movement patterns to collect optical information from the sensor. Similar to the system 100 described above with respect to FIG. 1, the system 300 can be implemented as an optical information collection system that includes the neuromorphic sensor 320 to collect optical information from a scene in response to change in photon flux detected at a photoreceptor of the neuromorphic sensor.

The controllable mirror 310, acting as a sensor stimulator, moves scene optical information across the neuromorphic sensor 320 to collect the optical information from the scene in response to a control command 334. The controllable mirror 310 can be activated via electro-mechanical forces and can include one, two, or three controllable mirrors for multi-axis control, for example. A controller 340 generates the control command 334 to the controllable mirror 310 to cause stimulation of the neuromorphic sensor 320 according to the fixational eye-movement model 330 that includes eye-movement patterns that describe movement of an eye and enables collection of the optical information data 350 from scene information 354. As the optical information data 350 is generated in response to movement of the controllable mirror 310 to project images on to the neuromorphic sensor 320, a lens assembly projects the scene information 354 from the controllable mirror 310 on to the neuromorphic sensor 320 so it can be stored in an optical information data storage 360 at the controller 340.

Figure 4:
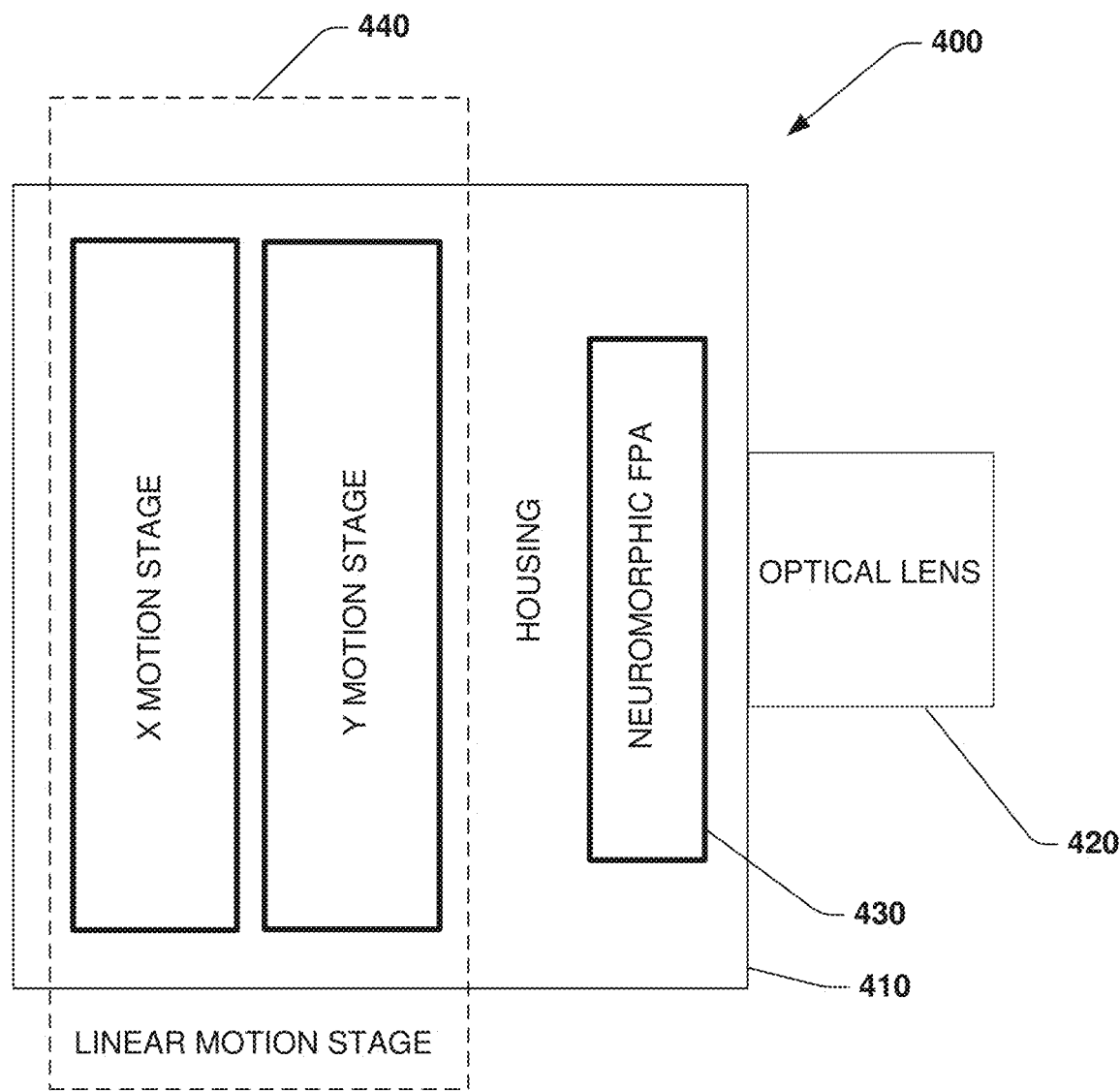
FIG. 4 illustrates an example device that employs a linear motion stage to move a neuromorphic sensor in accordance with a fixational eye-movement pattern to collect optical information from the sensor.

FIG. 4 illustrates an example device 400 that employs a linear motion stage to move a neuromorphic sensor in accordance with a fixational eye-movement model to collect optical information from the sensor. The device 400 includes a housing 410 that includes an optical lens 420 to receive optical information from a scene. A neuromorphic sensor 430 shown as a neuromorphic focal plane array (FPA) within the housing 410 collects optical information from the scene via the optical lens 420. A linear motion stage 440 in the housing 410 moves the neuromorphic sensor 430 in at least an X and a Y plane (e.g., via X motion stage and Y motion stage) to collect the optical information from the scene in response to a control command.

A controller (not shown) in the housing 410 generates the control command to the linear motion stage 440 to cause movement of the neuromorphic sensor according to a fixational eye-movement pattern that constrains movement of the neuromorphic sensor to movements of a human eye and enables collection of the optical information from the scene. The fixational eye-movement pattern includes a first parameter that describes a first position for the linear motion stage and includes a second parameter that describes movement of the linear motion stage along a specified distance and direction away from the first position. An example linear motion stage is shown at 450 whereas an example neuromorphic FPA is shown at 460—each of which can be mounted in the housing 410 at 430 and 440, respectively.

Figure 5:
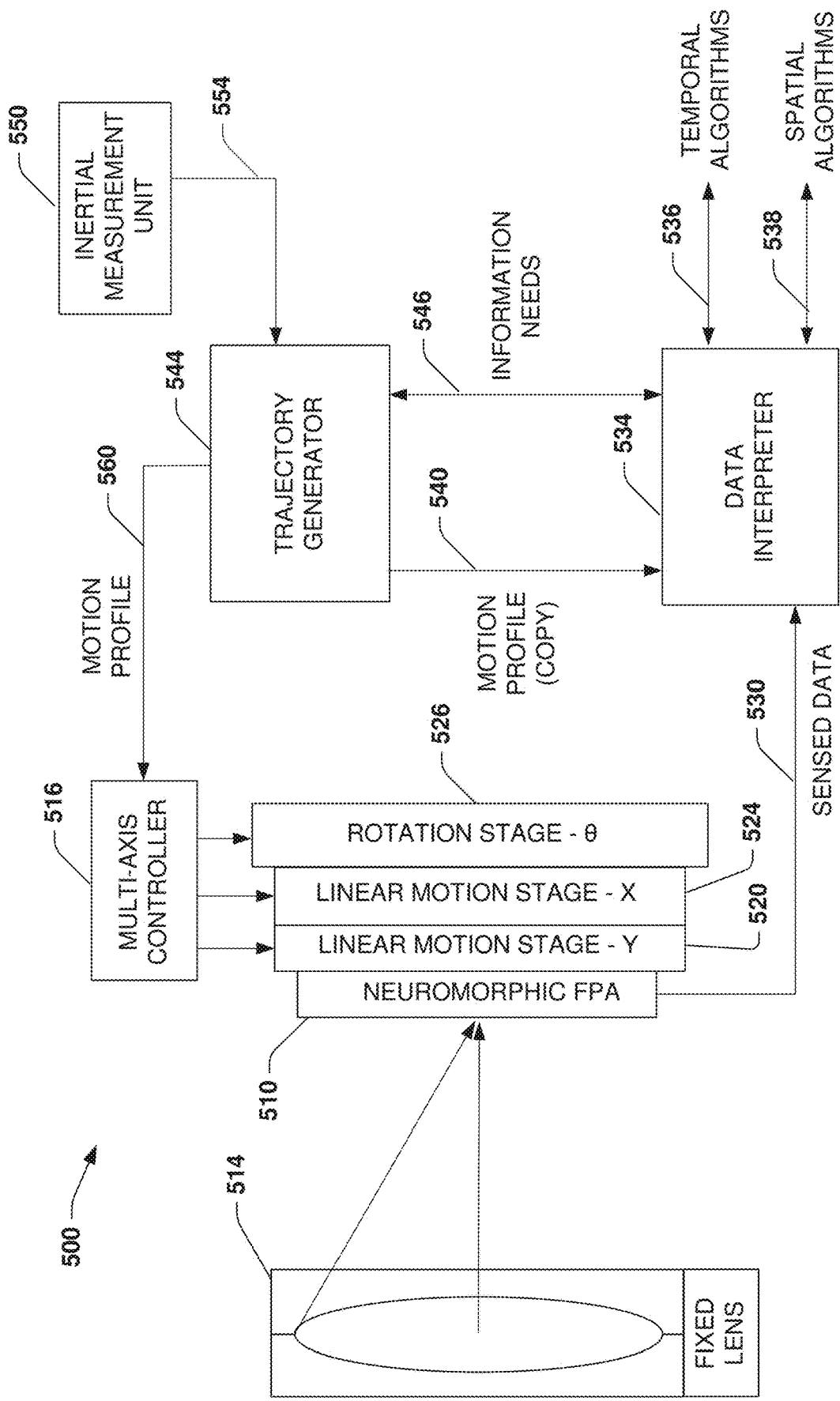
FIG. 5 illustrates an example system that employs a three-axis linear motion stage to move a neuromorphic sensor in accordance with a fixational eye-movement pattern to collect optical information from the sensor.

FIG. 5 illustrates an example system 500 that employs a three-axis linear motion stage to move a neuromorphic sensor 510 in accordance with a fixational eye-movement model to collect optical information from the sensor. A fixed lens 514 projects scene data on to the neuromorphic sensor 510. A multi-axis controller 516 sends control commands to three stages in this example to move the neuromorphic sensor 510. The three stages include a linear motion stage 520 for Y direction movement, a linear motion stage 524, for X direction movement, a rotational stage 526 to rotate the X and Y stages. As the neuromorphic sensor 510 is moved, sensor data 530 is collected by a data interpreter 534 which interacts with temporal and spatial algorithms at 536 and 538, respectively.

The data interpreter 534 receives a copy of the motion profile 540 describing the trajectory of the currently executing fixational eye-movement pattern (e.g. drift) described herein from a trajectory generator 544. About the same time or slightly later, the data interpreter receives the data generated by the sensor having just been stimulated by the motion. The data interpreter 534 monitors or calculates information needs (e.g., vertical or horizontal gradient edge requests) of the temporal and spatial algorithms 538 and 536 and conveys the gap in information needs relative to the previously sensed data to the trajectory generator 544. An inertial measurement unit 550 can also provide measured inertial data 554 to the trajectory generator. A processed motion profile 560 describing fixational eye-movements is sent from the trajectory generator 544 to the multi-axis controller 516 to control movement of the neuromorphic sensor 510 in accordance with fixational eye-movement models described herein.

Figure 6:
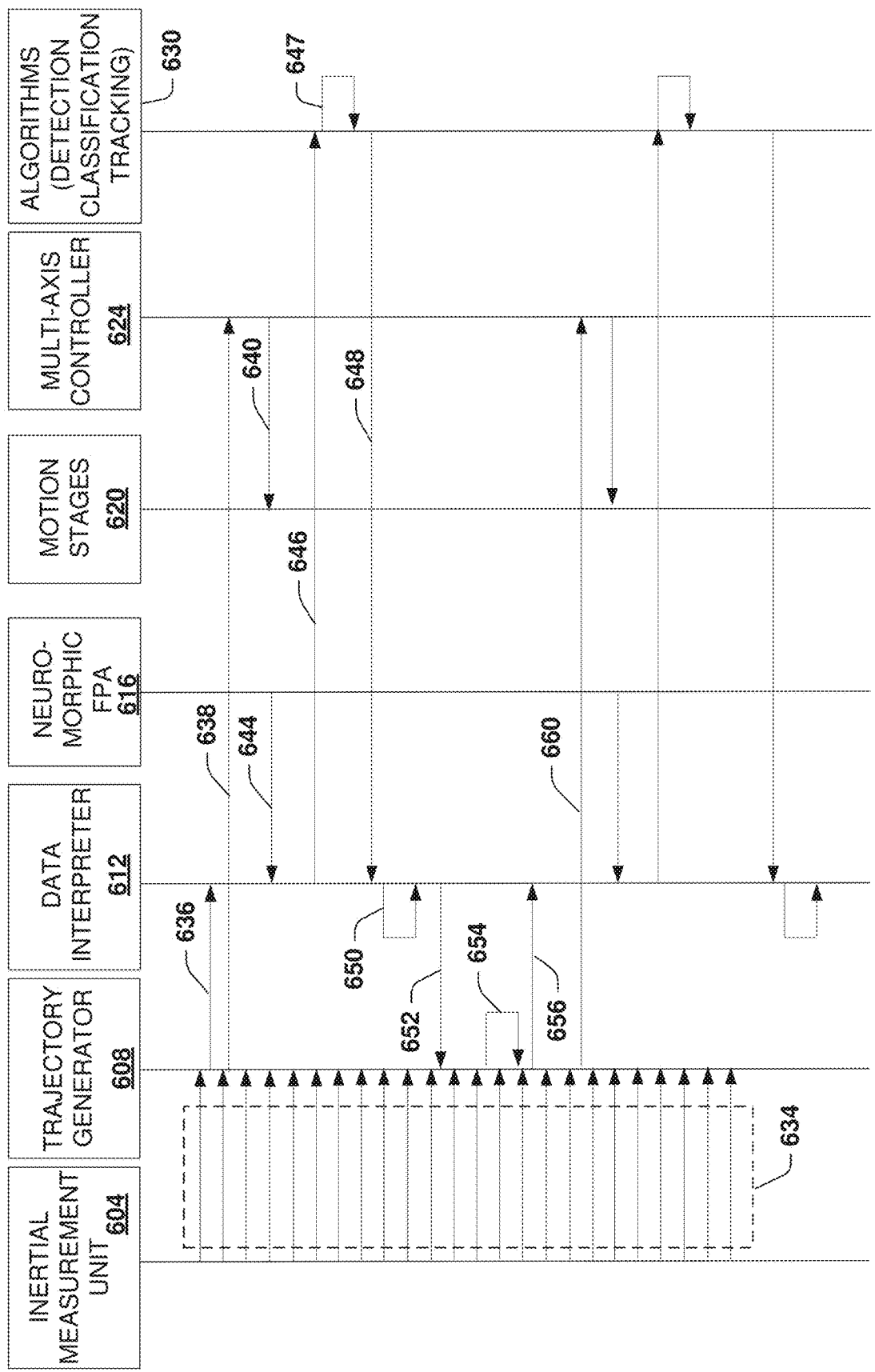
FIG. 6 illustrates and example process-flow diagram to execute the system illustrated in FIG. 5.

FIG. 6 illustrates and example process-flow diagram 600 to execute the system illustrated in FIG. 5. Process logic 604 represents the inertial measurement unit 550 of FIG. 5. Process logic 608 represents the trajectory generator 554 of FIG. 5. Process logic 612 represents the data interpreter 534 of FIG. 5. Process logic 616 represents the neuromorphic sensor 510 of FIG. 5. Process logic 620 represents the motion stages 520, 524, and 526 of FIG. 5. Process logic 624 represents the multi axis controller 516 of FIG. 5. Process logic 630 represents algorithms for scene detection, classification, and tracking. At 634, inertial measurement unit (IMU) data from process logic 604 is generated and sent to the trajectory generator 608. At 636, a motion trajectory is sent to the data interpreter 612 and at 638 a motion trajectory is sent to the multi axis controller 624 by the trajectory generator 608 in in response to the IMU data 604. At 640, the multi axis controller generates control signals to the motion stages 620 which cause movement of the sensor 616 and causes stimulated data 644 from the sensor to be sent to the data interpreter 612. At 646, collected data from the data interpreter 612 is transferred to the process logic 630. After processing at 647, the process logic 630 sends a desired information description to the data interpreter at 648, where the data interpreter calculates a difference of information sensed versus information yet to be collected at 650. At 652, the data interpreter 612 generates a request for information to be collected to the trajectory generator 608. At 654, the trajectory generator 608 calculates a new trajectory based on information needs and associated IMU data. At 656 and 660, new motion trajectories are generated by the trajectory generator and the process repeats to collect more information from the sensor 616.

Figure 7:
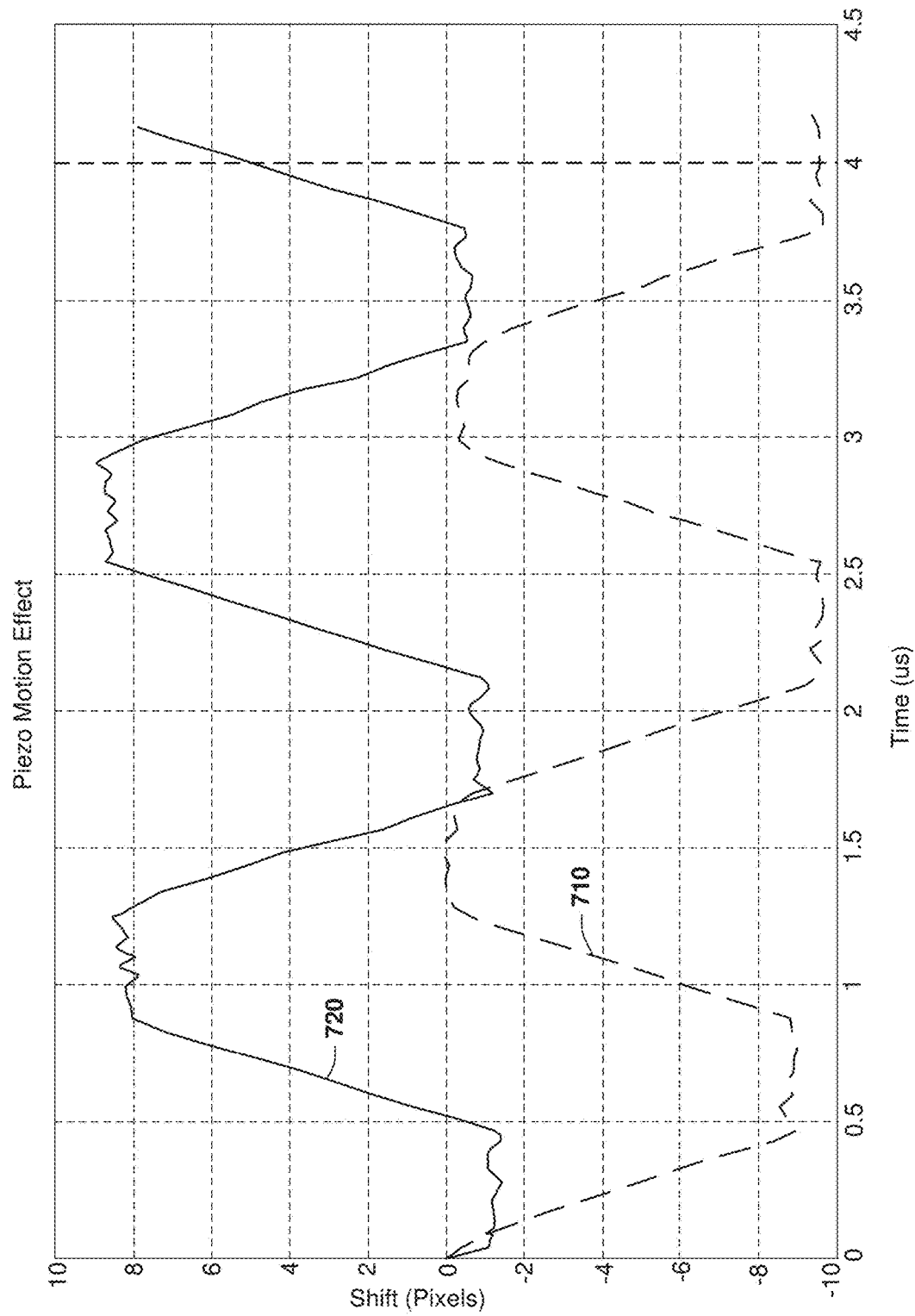
FIGS. 7, 8, and 9 illustrate example motion waveforms to move a neuromorphic sensor in accordance with a fixational eye-movement pattern.
Figure 9:
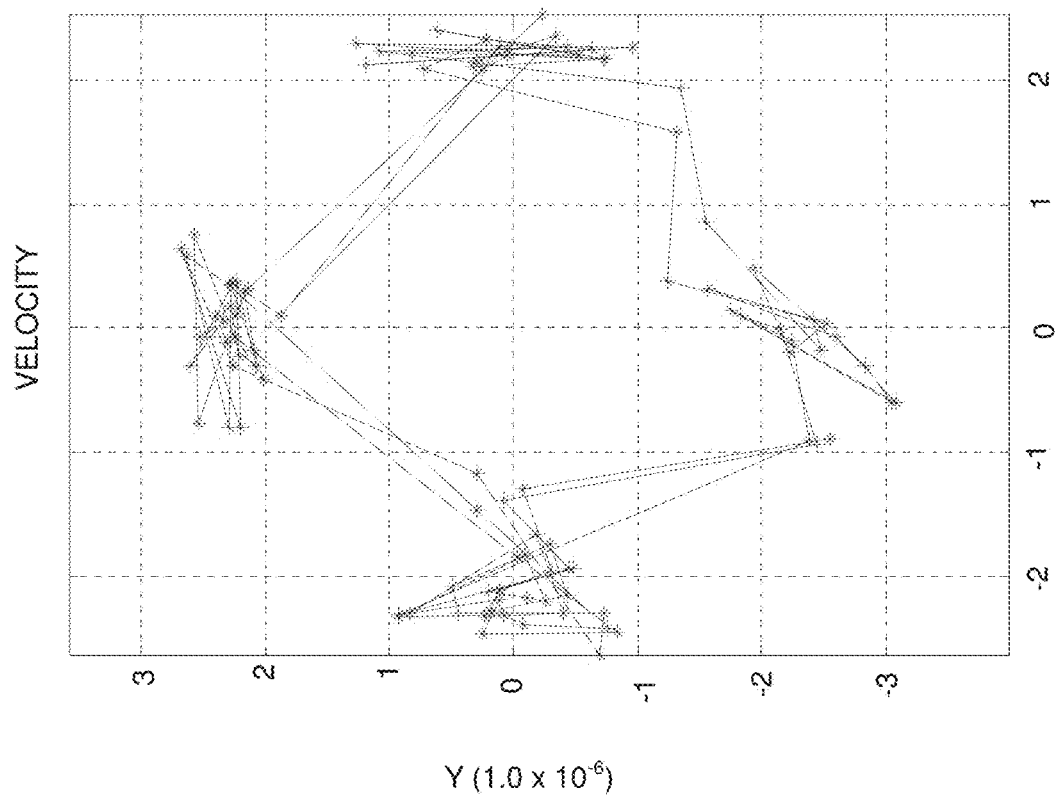
Figure 8:
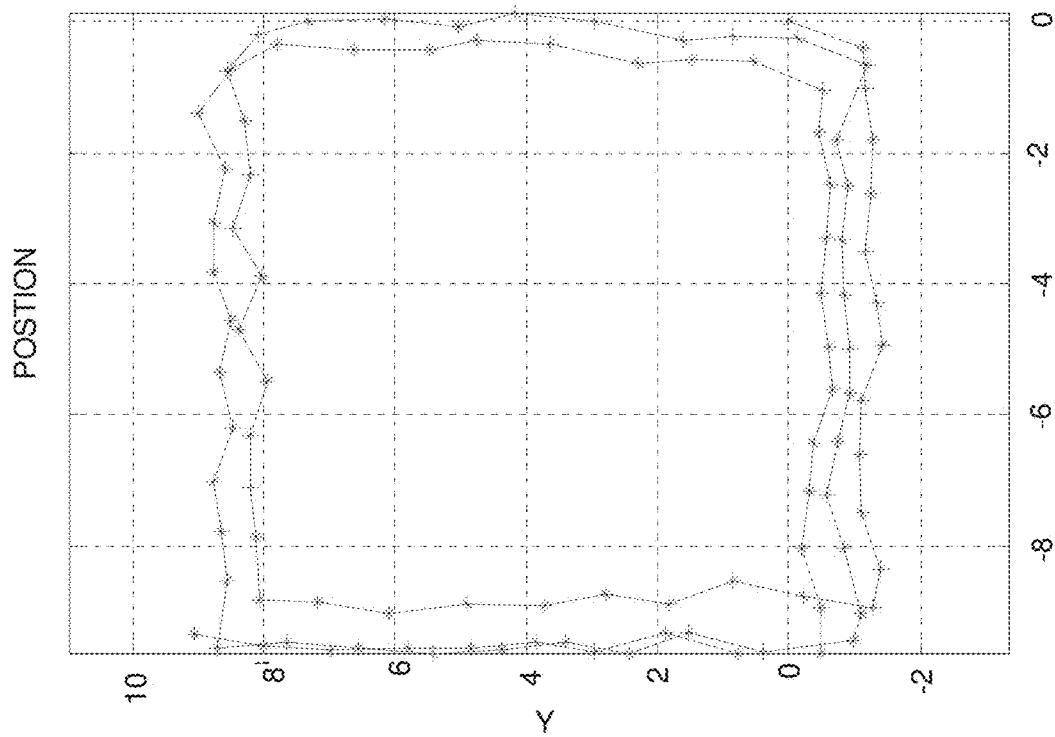

FIGS. 7, 8, and 9 illustrate example motion waveforms to move a neuromorphic sensor in accordance with a fixational eye-movement model. FIG. 7 illustrates example motion waveforms for a linear stage. The X axis of FIG. 7 represents a shift in a number of pixels versus time in microseconds on the Y axis of FIG. 7. A waveform 710 is a result of X axis movement of the linear motion stage described herein. A waveform 720 is a result of Y axis movement of the linear motion stage described herein. FIG. 8 illustrates some example position profiles for a sensor with Y axis positioning represented as a number of pixels on the Y axis of FIG. 8 and X axis positioning represented in a number pixels on the X axis of FIG. 8. FIG. 9 illustrates an example velocity profile with example Y axis velocities shown as times $10^{-6}$ on the Y axis of FIG. 9 and with respect to example X axis velocities shown on the X axis of FIG. 9.

Figure 10:
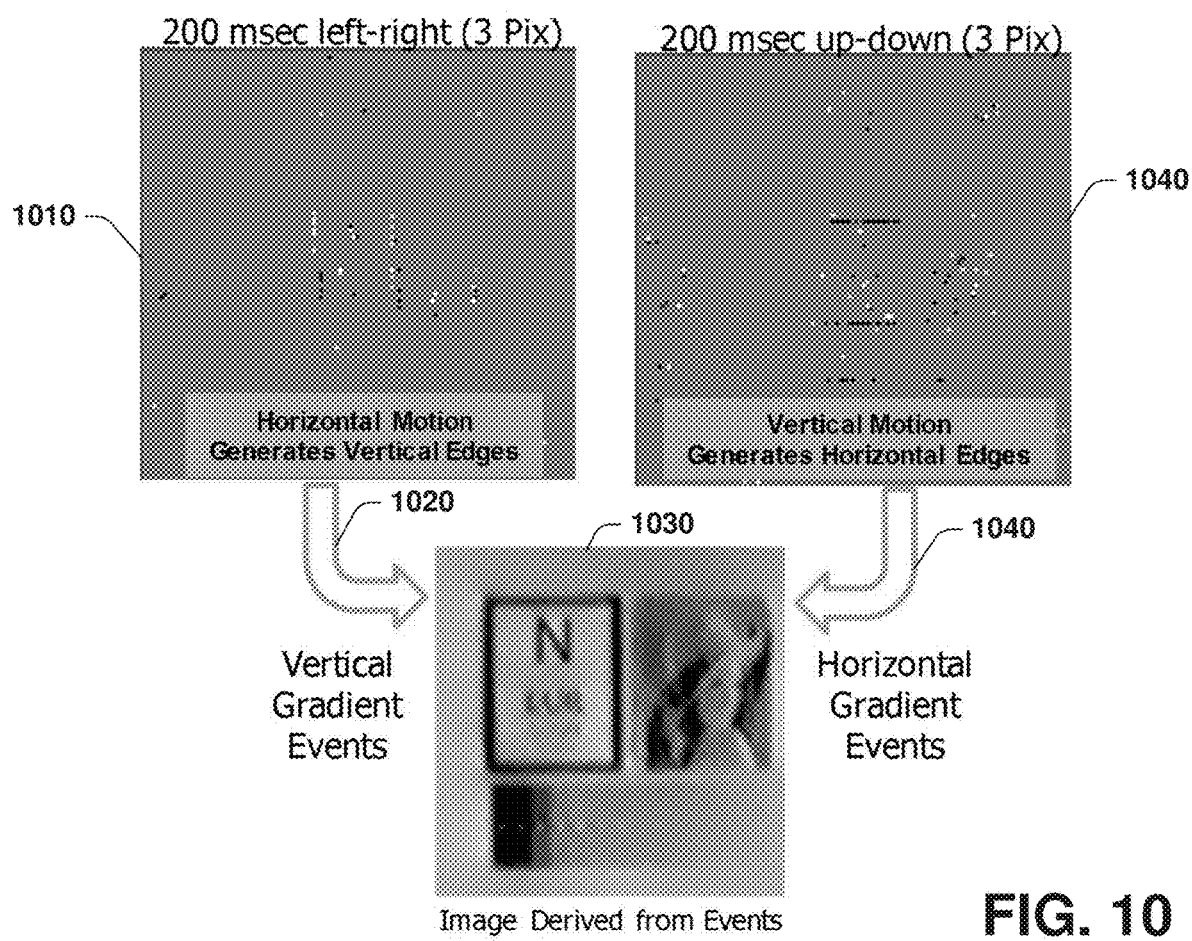
FIG. 10 illustrates example horizontal and vertical motion profiles to generate horizontal and vertical gradient events to generate an image from a neuromorphic sensor.

FIG. 10 illustrates example horizontal and vertical motion profiles to generate horizontal and vertical gradient events to generate an image from a neuromorphic sensor. At 1010, an example three-pixel left-right motion in two hundred milliseconds (or other time frame) generates horizontal gradient events 1020 for an image 1030 based on movement of the sensor. At 1040, an example three-pixel up-down motion in two hundred milliseconds generates vertical gradient events 1050 for the image 1030 based on movement of the sensor. Other sensor movements are also possible as described herein.

Figure 11:
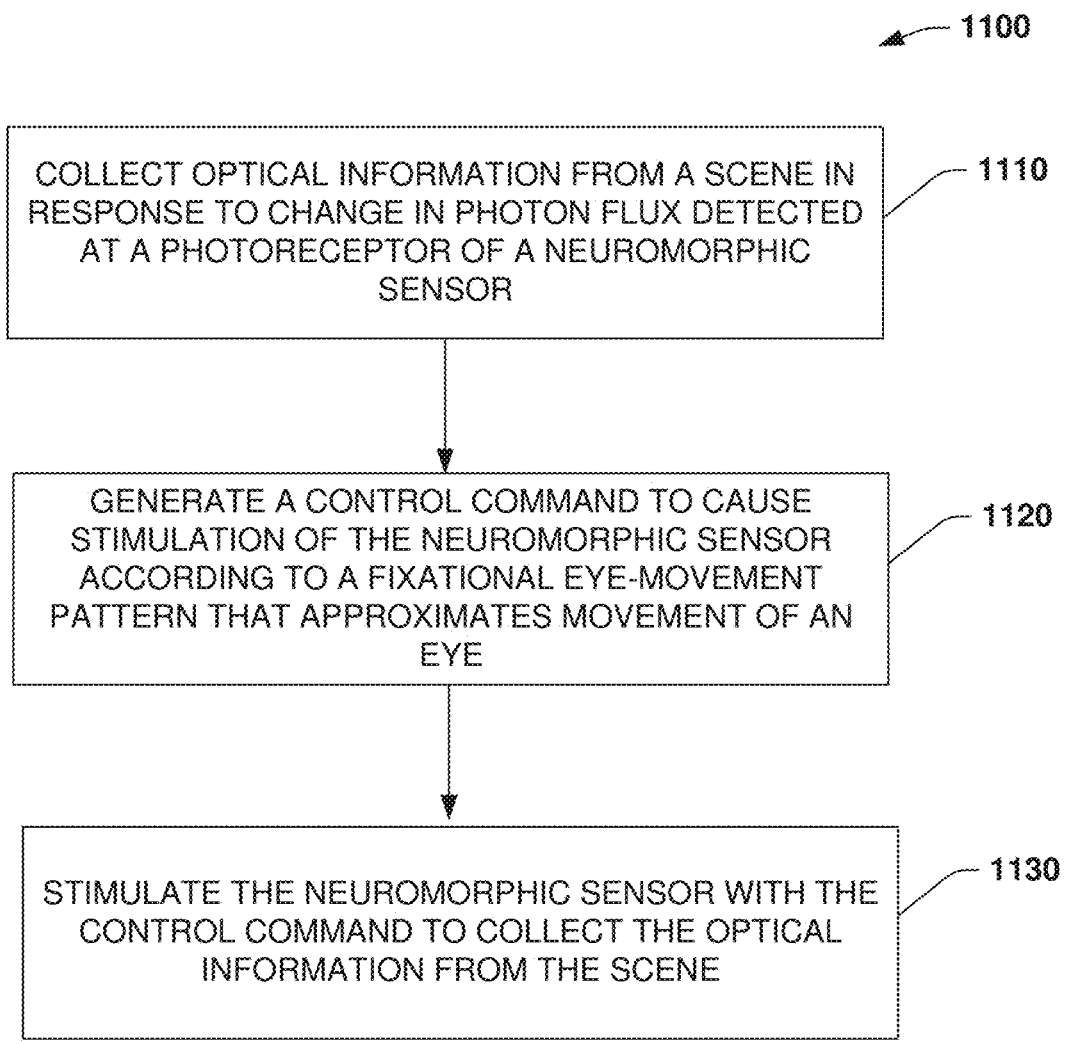
FIG. 11 illustrates an example method to stimulate a neuromorphic sensor in accordance with a fixational eye-movement pattern to collect optical information from the sensor.

In view of the foregoing structural and functional features described above, an example method will be better appreciated with reference to FIG. 11. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by a processor or controller executing machine-readable instructions from a computer-readable medium.

FIG. 11 illustrates an example method 1100 to stimulate a neuromorphic sensor in accordance with a fixational eye-movement model to collect optical information from the sensor. At 1110, the method 1000 includes collecting optical information from a scene in response to change in photon flux detected at a photoreceptor of a neuromorphic sensor. At 1120, the method 1100 includes generating a control command to cause stimulation of the neuromorphic sensor according to a fixational eye-movement pattern that approximates movement of a human eye. The fixational eye-movement pattern includes a first parameter that describes a first position to collect the optical information and includes a second parameter that describes movement along a specified distance and direction away from the first position. At 1130, the method 1100 includes stimulating the neuromorphic sensor with the control command to collect the optical information from the scene. In an example, the second parameter describes speed and direction for an optical micro tremor movement, a drift movement, or a micro saccades movement with respect to the first position to collect the optical information.

Figure 12:
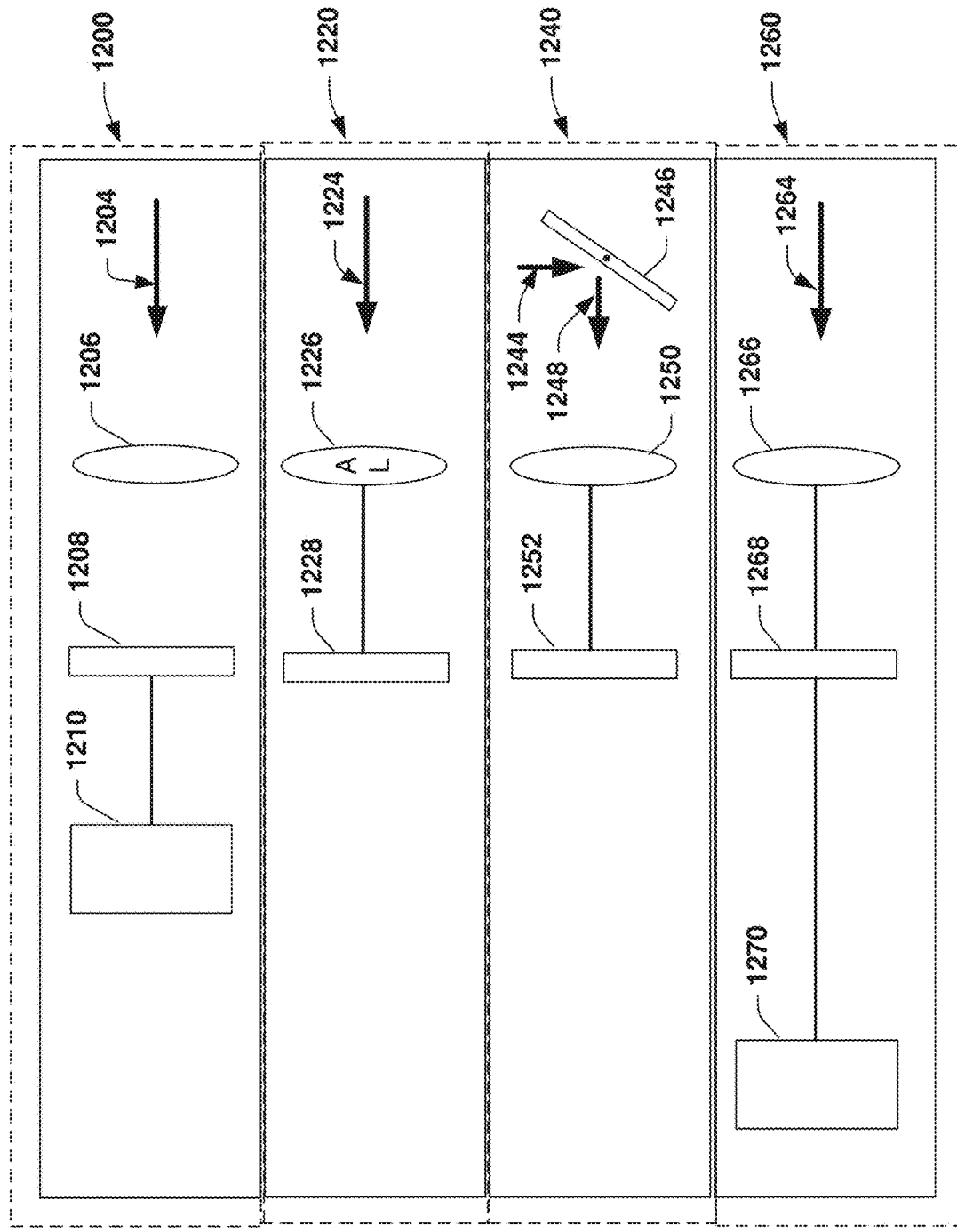
FIG. 12 illustrates alternative examples for stimulating a neuromorphic sensor to collect data according to an eye-movement pattern.

FIG. 12 illustrates alternative example systems for stimulating a neuromorphic sensor to collect data according to an eye-movement pattern. At 1200, light from a scene at 1204 is projected though a lens 1206 on to neuromorphic sensor 1208 that is coupled to linear actuators 1210, where the linear actuators move the sensor behind the lens. This system at 1200 enables precise motions in distance and velocity and provides torsional motion as well as angular pan and tilt. Velocities and distance provided in pixel space can be controlled, while simplifying variable focal length lens operation. This also facilitates low power and compact systems configurations. At 1220, light from a scene at 1224 is projected through an actuated lens (AL) 1226 that is coupled to a neuromorphic sensor 1228. In this example, the AL 1226 long with the sensor 1228 can be moved according to actuation commands applied to the lens to cause image collection at the sensor. Precise motions in distance and velocity can be provided as well as providing low power and compact systems configurations.

At 1240, light from a scene at 1244 is projected on to a controllable mirror 1246 (e.g., rotating mirror) that is then projected as reflected light 1248 through a lens 1250 that is coupled to a neuromorphic sensor 1252. The system 1240 also supports precise motions in distance and velocity along with providing low power and compact systems configurations. At 1260, light from a scene 1264 is projected through a lens 1266. In this example, the lens 1266 is coupled to a neuromorphic sensor 1268 which is also coupled to a moving platform or system such as a gimble 1270. Thus, the lens 1266 and sensor 1270 are both moved by the gimble 1270 to collect light from the scene at 1264. This system 1260 facilitates macro-pointing movements having larger angular motions for collecting data from the scene at the neuromorphic sensor 1268.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An optical information collection system, comprising:
   a neuromorphic sensor to collect optical information from a scene in response to change in photon flux detected at a plurality of photoreceptors of the neuromorphic sensor;
   a sensor stimulator to stimulate a subset of the plurality of photoreceptors according to a fixational eye movement model that defines an eye movement pattern in response to a control command, wherein the fixational eye-movement model includes a first parameter that describes a first position for the sensor stimulator and includes a second parameter that describes a movement of the sensor stimulator to stimulate the plurality of photoreceptors; and
   a controller to generate the control command that includes instructions to execute the eye movement model.

2. The system of claim 1, wherein the second parameter is constrained to a predetermined distance away from the first position based on similar constraints of movement associated with a human eye.

3. The system of claim 2, wherein the fixational eye movement model includes a third parameter that defines a speed of movement for the sensor stimulator from the first position and along the specified distance described by the second parameter.

4. The system of claim 2, wherein the second parameter defines a drift movement with respect to the first position for the sensor stimulator, wherein the drift movement occurs over a distance of about 3 to 12 photoreceptors at a mean speed of about 3 to 30 photoreceptors per second as specified by the third parameter.

5. The system of claim 4, wherein the second parameter defines an ocular micro tremor (OMT) movement with respect to the first position for the sensor stimulator, the OMT movement is a periodic motion superimposed upon the drift movement from the starting position up to the specified distance defined by the second parameter, the OMT movement having an amplitude of about 1 to 3 photoreceptors and a frequency range of about 2 Hertz (Hz) to about 150 Hz as specified by the third parameter.

6. The system of claim 3, wherein the second parameter defines a micro saccades movement with respect to a current position for the sensor stimulator, wherein the micro saccades movement occurs over a distance of about 3 to 15 photoreceptors, at a speed of about 100 to 10000 photoreceptors per second.

7. The system of claim 1, wherein the sensor stimulator is a linear motion stage that moves the neuromorphic sensor across an initial X and Y plane to collect optical information from the scene in response to the control command, wherein movement of the linear motion stage in the X direction collects vertical edges from the scene from pixels of the neuromorphic sensor, movement in the Y direction collects horizontal edges from the scene from pixels of the neuromorphic sensor, and concurrent movement in the X and Y direction collects information oriented diagonally across the neuromorphic sensor.

8. The system of claim 7, wherein the linear motion stage further comprises a third axis to vertically move the neuromorphic sensor to a different plane from the initial X and Y plane.

9. The system of claim 7, wherein the linear motion stage includes a rotational axis to rotate the initial X and Y plane.

10. The system of claim 1, wherein the sensor stimulator includes a controllable mirror that moves optical information collected from a scene through a lens assembly across the neuromorphic sensor, in response to the control command.

11. The system of claim 1, wherein the sensor stimulator includes a gimble that is coupled to the neuromorphic sensor and a lens assembly, the gimble being moved in one or more directions across the scene to collect optical information from the scene on to the neuromorphic sensor in response to the control command.

12. The system of claim 1, wherein the sensor stimulator includes lens assembly having at least one actuated refractive element responsive to the control command, the at least one actuated refractive element causing light received from the scene to stimulate the neuromorphic sensor.

13. A device, comprising:
- a housing that includes an optical lens to receive optical information from a scene;
- a neuromorphic sensor within the housing to collect optical information from the scene via the optical lens;
- a sensor stimulator to stimulate the neuromorphic sensor according to an eye-movement pattern in response to a control command; and
- a controller in the housing to generate the control command to the sensor stimulator to cause movement of the sensor stimulator according to the eye-movement pattern to approximate movements of a human eye and enable collection of the optical information from the scene, the eye-movement pattern includes a first parameter that describes a first position for the sensor stimulator and includes a second parameter that describes movement of the sensor stimulator along a specified distance and direction away from the first position.

14. The device of claim 13, wherein the fixational eye-movement pattern further comprises a third parameter that defines a speed of movement for the sensor stimulator from the first position and along the specified distance and direction described by the second parameter.

15. The device of claim 14, wherein the second parameter defines a drift movement with respect to the first position for the sensor stimulator, wherein the drift movement occurs over a distance of about 3 to 12 photoreceptors of the neuromorphic sensor at a mean speed of about 3 to 30 photoreceptors per second as specified by the third parameter.

16. The device of claim 15, wherein the second parameter defines an ocular micro tremor (OMT) movement with respect to the first position for the sensor stimulator, the OMT movement is a periodic motion superimposed upon the drift movement from the starting position up to the specified distance defined by the second parameter, the OMT movement having an amplitude of about 1 to 3 photoreceptors of the neuromorphic sensor and a frequency range of about 2 Hertz (Hz) to about 150 Hz as specified by the third parameter.

17. The device of claim 14, wherein the second parameter defines a micro saccades movement with respect to a current position for the sensor stimulator, wherein the micro saccades movement occurs over a distance of 3 to 15 photoreceptors of the neuromorphic sensor, at a speed of about 100 to 10000 photoreceptors per second.

18. The device of claim 13, wherein the sensor stimulator is at least one of a linear motion stage, a controllable mirror, a lens assembly having at least one actuated refractive element, and a gimble assembly.

19. A method, comprising:
- collecting optical information from a scene in response to change in photon flux detected at a photoreceptor of a neuromorphic sensor;
- generating a control command to cause stimulation of the neuromorphic sensor according to a fixational eye-movement pattern that approximates movement of a human eye, the fixational eye-movement pattern includes a first parameter that describes a first position to collect the optical information and includes a second parameter that describes movement along a specified distance and direction away from the first position; and
- stimulating the neuromorphic sensor with the control command to collect the optical information from the scene.

20. The method of claim 19, wherein the second parameter describes speed and direction for an optical micro tremor movement, a drift movement, or a micro saccades movement with respect to the first position to collect the optical information.

* * * * *